(12) United States Patent
Nakamoto

(10) Patent No.: US 6,266,179 B1
(45) Date of Patent: Jul. 24, 2001

(54) OPTICAL TRANSMISSION APPARATUS, OPTICAL REPETITION APPARATUS AND OPTICAL TRANSMISSION METHOD

(75) Inventor: Hiroshi Nakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/145,031

(22) Filed: Sep. 1, 1998

(30) Foreign Application Priority Data

Mar. 19, 1998 (JP) .................................................. 10-069691

(51) Int. Cl.[7] ........................................................ G02F 1/39
(52) U.S. Cl. ............................................. 359/330; 359/326
(58) Field of Search ................................... 359/326–332; 385/15, 24, 122

(56) References Cited

U.S. PATENT DOCUMENTS

| | | | |
|---|---|---|---|
| 4,784,450 | * 11/1988 | Jain et al. | 359/332 |
| 5,243,610 | * 9/1993 | Murata | 359/328 X |
| 5,559,910 | * 9/1996 | Taga et al. | 385/24 |
| 5,604,618 | * 2/1997 | Mori et al. | 359/326 X |
| 6,104,514 | * 8/2000 | Fee et al. | 359/161 |

* cited by examiner

Primary Examiner—John D. Lee
(74) Attorney, Agent, or Firm—Staas & Halsey LLP

(57) ABSTRACT

An object is to provide an optical transmission apparatus, an optical repetition apparatus and an optical transmission method in which the chirp polarity applied to an output signal light can be modified easily in accordance with the wavelength dispersion characteristics of a transmission path. Therefore, for example, with the optical transmission apparatus according to the invention a signal light of optical frequency fsig generated by a signal light generating device, and a probe light of optical frequency fp generated by a probe light generation device are input to a four wave mixing generation device having a nonlinear optical effect to generate various signal lights with optical frequencies of fsig, fp, 2×fsig−fp and 2×fp−fsig. One of the signal lights output from the four wave mixing generation device is selected by a signal light selection device and output to the transmission path. Consequently, the chirp applied to the signal light and the polarity thereof can be modified easily in accordance with the wavelength dispersion characteristics of the transmission path.

17 Claims, 7 Drawing Sheets

OPTICAL TRANSMISSION APPARATUS, OPTICAL REPETITION APPARATUS AND OPTICAL TRANSMISSION METHOD

BACKGROUND OF THE INVENTION

1. Field of the Invention

The present invention relates to an optical transmission apparatus, an optical repetition apparatus and an optical transmission method for use in an optical communications system, and in particular to an optical transmission apparatus, an optical repetition apparatus and an optical transmission method in which a signal light is output for which compensation has been made for wavelength dispersion in the transmission path.

2. Description of the Related Art

It is well known that in ultra high speed optical communication systems waveform distortion resulting from the wavelength dispersion characteristics of an optical fiber produces a deterioration in the quality of the transmission. In order to reduce the effect of this wavelength dispersion, optimization of so-called "chirping" is used, where a fluctuation of suitable magnitude and in a suitable direction is generated in the wavelength of the signal light waveform at the rising and falling of the signal. For example, when transmitting a 1.55 $\mu$m light signal through a 1.3 $\mu$m band zero dispersion fiber, by lengthening the wavelength of the signal light at the rising, and shortening the wavelength at the falling, it is possible to create a signal light waveform which retains good form following transmission through the optical fiber.

The aforementioned chirping is conducted by using a device such as a semiconductor light modulator. It is known that with this type of light modulator the phase modulated component which is generated causes the fluctuation in the wavelength of the light (the chirp). The amount of chirping generated can be expressed in terms of an $\alpha$ parameter. The $\alpha$ parameter is a quantity determined by the operating wavelength and the absorption spectra of the light modulator, and the degree of variation in the dispersion of the refractive index. Thus, chirping can be created in the signal light by considering the $\alpha$ parameter and then setting the operating conditions of the light modulator accordingly.

In current optical transmission and optical repetition apparatus, compensation for wavelength dispersion within an optical fiber has been made by using a light modulator as described above to cause a chirp in the signal light which is of an appropriate magnitude for the wavelength dispersion characteristics of the connected optical fiber.

However, the polarity of the appropriate chirp to be created in the signal light will vary depending on the type of optical fiber through which the signal light is to be transmitted. Chirping generated by a semiconductor light modulator however, is generally of a fixed polarity. Consequently, with current optical transmission and optical repetition apparatus, the altering of the polarity of the chirp in the signal light in accordance with the transmission path being used has been problematic.

Techniques for altering the polarity of a chirp include the use of a nonlinear optical phenomenon known as a four wave mixing effect, and this technique has been reported in Japanese Unexamined Patent Publication No. 63-103215 and Japanese Unexamined Patent Publication No. 7-312574.

The technique outlined in the former of the above two publications involves compression of a light pulse by taking a high output light pulse in which a positive chirp has been generated by transmission through an optical fiber, and following conversion via a four wave mixing medium to a light pulse with a negative chirp, re-transmitting the pulse through the optical fiber. The object of this technique then is to achieve compression of the light pulse by utilizing the wavelength dispersion characteristics of the optical fiber, and it is not possible to generate a signal light in which compensation has been made for the wavelength dispersion characteristics of the optical fiber, as is the object of the present invention.

The technique outlined in the latter of the above two publications involves the connection of two optical fibers with equal amounts of wavelength dispersion to either end of a phase conjugated light generating apparatus which utilizes a four wave mixing effect, so that the wavelength dispersion generated in each of the optical fibers is cancelled out. However with this technique, if it becomes necessary to replace one of the optical fibers connected to the phase conjugated light generating apparatus, then in order to maintain equality in the amount of wavelength dispersion before and after the phase conjugated light generating apparatus it is necessary to replace both of the optical fiber. Consequently, dealing with modifications in an optical communication system using this technique is problematic.

SUMMARY OF THE INVENTION

The present invention takes into consideration the above problems with the object of providing an optical transmission apparatus, an optical repetition apparatus and an optical transmission method in which the chirp polarity applied to an output signal light can be modified easily in accordance with the wavelength dispersion characteristics of the connected transmission path.

In order to achieve the above object, an optical transmission apparatus according to the present invention comprises; a signal light generation device for generating a signal light which has been modulated in accordance with a transmission signal, a probe light generation device for generating a probe light of an optical frequency different from the optical frequency of the signal light generated by the signal light generation device, a four wave mixing generation device in which the signal light output from the signal light generation device and the probe light output from the probe light generation device are injected into a medium having a nonlinear optical effect to generate four wave mixing, and a signal light selection device for selecting one of the signal lights output from the four wave mixing generation device in accordance with the wavelength dispersion characteristics of the transmission path and then outputting the selected signal light to the transmission path.

Furthermore, an optical repetition apparatus according to the present invention comprises; a probe light generation device for generating a probe light of a different optical frequency to that of a signal light received from an input transmission path, a four wave mixing generation device in which the signal light received from the input transmission path and the probe light output from the probe light generation device are injected into a medium having a nonlinear optical effect to generate four wave mixing, and a signal light selection device for selecting one of the signal lights output from the four wave mixing generation device in accordance with the wavelength dispersion characteristics of an output transmission path and then outputting the selected signal light to the output transmission path.

With an optical transmission apparatus and an optical repetition apparatus of such a construction, by injecting a signal light and a probe light of different optical frequencies into a medium having a nonlinear optical effect, light resulting from four wave mixing is generated. The light generated by the four wave mixing generation device incorporates signals such as the signal resulting from reversal of the chirp polarity in the signal light, and a signal light which is suitable for compensating for the wavelength dispersion characteristics of the transmission path connected to the apparatus is selected and then output by the signal light selection device.

Consequently, the chirp applied to the signal light and the polarity thereof can be modified easily in accordance with the wavelength dispersion characteristics of the connected transmission path, and so an optical transmission apparatus and an optical repetition apparatus can be provided in which the transmission characteristics can be readily adapted to deal with any modifications to the optical communication system.

Furthermore, with the optical transmission apparatus, preferably an optical frequency control device is provided for controlling at least one of, the optical frequency of the signal light generated by the signal light generation device and the optical frequency of the probe light generated by the probe light generation device. Moreover with the optical repetition apparatus also, preferably an optical frequency control device is provided for controlling the optical frequency of the probe light generated by the probe light generation device.

The provision of an optical frequency control device enables the optical frequencies of the signal lights generated by the four wave mixing generation device to be altered appropriately to match the wavelength dispersion characteristics of the transmission path.

Moreover, with the optical transmission apparatus and the optical repetition apparatus, the construction may incorporate; a signal light modulation device for superimposing a first modulation signal on the signal light, a probe light modulation device for superimposing a second modulation signal different from the first modulation signal on the probe light generated by the probe light generation device, a modulation signal detection device for detecting the superimposed modulation signal in the signal light output from the signal light selection device, an optical power detection device for altering the optical frequency by means of the optical frequency control device in accordance with the detection results from the modulation signal detection device and detecting the optical power in at least two wavelength regions of the signal light output from the signal light selection device, and an optical output identification device for identifying, based on the detection results from the modulation signal detection device and the optical power detection device, whether or not a signal light in accordance with the wavelength dispersion characteristics of the transmission path is being output from the signal light selection device. In addition, preferably an optical output control device is provided for controlling the output conditions of the signal light output from the signal light selection device to the transmission path in accordance with the identification results from the optical output identification device.

With such a construction, by superimposing different first and second modulation signals on the signal light and the probe light respectively, a modulation signal which corresponds with the optical frequency of the first and/or second modulation signal is superimposed on the signal light output from the four wave mixing generation device. Consequently, with the signal light selected by the signal light selection device, by detecting the superimposed modulation signal, a broad classification is possible as to which of the signal lights generated by the four wave mixing generation device was selected. Moreover, by altering the optical frequencies of the signal light and the probe light by means of the optical frequency control device and detecting in at least two wavelength regions the variation in optical power of the signal light output from the signal light selection device, an even more specific identification of the selected signal light becomes possible. By identifying via an optical output identification device, based on the detection results described above, whether or not a signal light in accordance with the wavelength dispersion characteristics of the transmission path is being output from the signal light selection device, compensation for wavelength dispersion within the transmission path can be achieved with greater reliability.

Specific examples of the first modulation signal and the second modulation signal include signals with different frequencies, or signals with the same frequency but for which the phases differ by ¼ or ½ of a cycle, and for each modulation signal the frequency and phase of the modulation signal superimposed on the signal light output from the signal light selection device may be detected using the modulation signal detection device.

Furthermore with the optical frequency control device it is also possible to control the optical frequency to optimize the reception characteristics, based on information relating to the results of reception processing by an optical reception apparatus connected to a terminal of the transmission path. By using such a technique, compensation for wavelength dispersion within the transmission path can be carried out effectively.

A transmission method according to the present invention incorporates; a step for generating a probe light of an optical frequency different from the optical frequency of a signal light modulated in accordance with a transmitted signal, a step for generating four wave mixing in which the signal light and the probe light are injected into a medium having a nonlinear optical effect, and a step for selecting one of the signal lights generated by the four wave mixing in accordance with the wavelength dispersion characteristics of a transmission path and then outputting the selected signal light to the transmission path.

Other objects, features and advantages of the present invention will become apparent from the following description of embodiments given in conjunction with the appended drawings.

DETAILED DESCRIPTION OF THE PREFERRED EMBODIMENTS

Embodiments of the present invention are described below with reference to the accompanying drawings.

Figure 1:
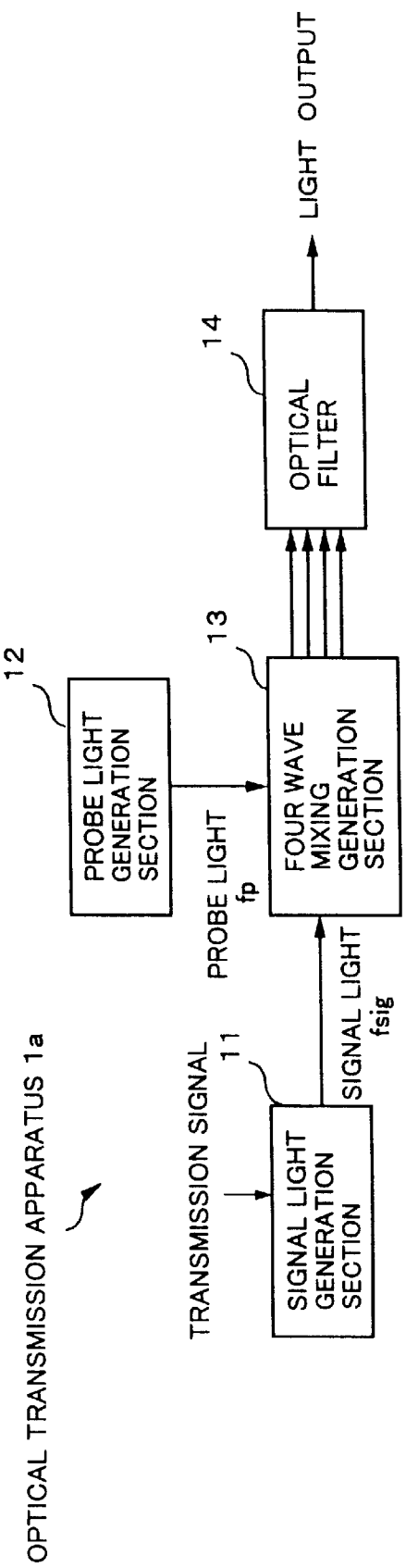
FIG. 1 is a diagram showing the construction of an optical transmission apparatus according to a first embodiment of the present invention.

FIG. 1 is a block diagram showing the construction of an optical transmission apparatus according to a first embodiment of the present invention.

In FIG. 1, an optical transmission apparatus 1a comprises, for example, a signal light generation section 11 serving as a signal light generation device for generating a signal light of optical frequency fsig (wavelength λsig), a probe light generation section 12 serving as a probe light generation device for generating a probe light of optical frequency fp (wavelength λp), a four wave mixing generation section 13 serving as a four wave mixing generation device which accepts input of the signal light and the probe light and generates four wave mixing, and an optical filter 14 serving as a signal light selection device for selecting and then outputting one of the signal lights output from the four wave mixing generation section 13.

The signal light generation section 11 generates a high speed modulated signal light in accordance with a transmission signal input from an external source. A signal light modulation system can involve either a direct modulation system where the light output from a light source is intensity modulated directly, or a system where the light output from a light source is modulated externally by an optical modulator. Furthermore, the coding format may be an optional format such as NRZ and RZ. With this embodiment the optical frequency fsig (wavelength λsig) is set in accordance with the wavelength dispersion characteristics of a transmission path, such as an optical fiber, to which the optical transmission apparatus 1a is connected, and can be adjusted by altering the temperature settings and/or the bias current of the light source. Consequently, with this embodiment the signal light generation section 11 also functions as an optical frequency control device.

The probe light generation section 12 generates a probe light of optical frequency fp (wavelength λp) set in accordance with the wavelength dispersion characteristics of the transmission path to which the optical transmission apparatus 1a is connected, and then outputs the probe light to the four wave mixing generation section 13. The probe light employed is a non-modulated DC light. The optical frequency fp (wavelength λp) can be adjusted by altering the temperature settings and/or the bias current of the light source. Consequently, with this embodiment the probe light generation section 12 also functions as an optical frequency control device.

The four wave mixing generation section 13 can use any medium which creates a nonlinear optical effect, and suitable media include a semiconductor light amplifier with a large nonlinear optical constant, or a long optical fiber with little wavelength dispersion in the wavelength region of the signal light.

The optical filter 14 is a filter with a sufficiently narrow pass band that will pass only light of a specified optical frequency (wavelength). Furthermore, with this embodiment the mean frequency of the pass band is variable.

With the optical transmission apparatus 1a of this construction the signal light of optical frequency fsig output from the signal light generation section 11 and the probe light of optical frequency fp output from the probe light generation section 12 are sent to the four wave mixing generation section 13. At the four wave mixing generation section 13 into which the signal light and the probe light have been input, four wave mixing is generated using a nonlinear optical effect.

The four wave mixing is a phenomenon which is used in the alteration of the wavelength of a signal light and so on. In general, in the case where three signal lights of optical frequency fi, fj and fk respectively are injected into a medium having a nonlinear optical effect, this phenomenon will generate a fourth signal light of optical frequency fi+fj−fk. Furthermore, in the case where two kinds of light are injected (of optical frequency fi and fj, for example) signal lights of optical frequency 2×fi−fj and 2×fj−fi will be generated.

With this embodiment, by inputting into the four wave mixing generation section 13 a signal light of optical frequency fsig and a probe light of optical frequency fp, four different lights with the optical frequencies shown below will be output from the four wave mixing generation section 13.

fsig
fp
2×fsig−fp
2×fp−fsig

Focusing on the signal light of optical frequency 2×fp−fsig, if the optical frequency fsig is increased then the value of 2×fp−fsig decreases, and so a movement in the optical frequency of a signal light before the four wave mixing generation section 13 produces a completely opposite movement in the optical frequency following output. If, for example, the size of a chirp on a signal light being input to the four wave mixing generation section 13 is +1, then the size of the chirp on the signal light of optical frequency 2×fsig−fp output from the four wave mixing generation section will be +2, and the size of the chirp on the signal light of optical frequency 2×fp−fsig will be −1.

Consequently, for signal lights where the chirp polarity is dependent on the chirp characteristics of the signal light generation section 11, by using the optical filter 14 to pick out the signal light of optical frequency 2×fp−fsig, it is possible to obtain a signal light in which the chirp polarity has been reversed. Furthermore, by picking out the signal light of optical frequency 2×fsig−fp, it is possible to double the amount of chirp on the signal light. Of course by picking out the signal light of optical frequency fsig it is also possible to obtain a signal light which corresponds with the chirp characteristics of the signal light generation section 11. Furthermore, the size of the chirp on each signal light output from the four wave mixing generation section 13 can be altered by setting to appropriate values the optical frequencies (wavelengths) of the signal light, the probe light, or of both lights.

With the optical transmission apparatus 1a according to the first embodiment of the present invention, the chirp characteristics, including the polarity, of the output signal light can be modified easily in accordance with the wavelength dispersion characteristics of the connected transmission path. Consequently, an optical transmission apparatus can be provided in which the transmission characteristics can be readily adapted to deal with any modifications to the optical communication system.

Next is a description of a second embodiment according to the present invention.

With the second embodiment, a description is given of the case where identification is made as to whether or not the signal light passing through the optical filter 14 of the optical transmission apparatus 1a according to the first embodiment is of the required type.

Figure 2:
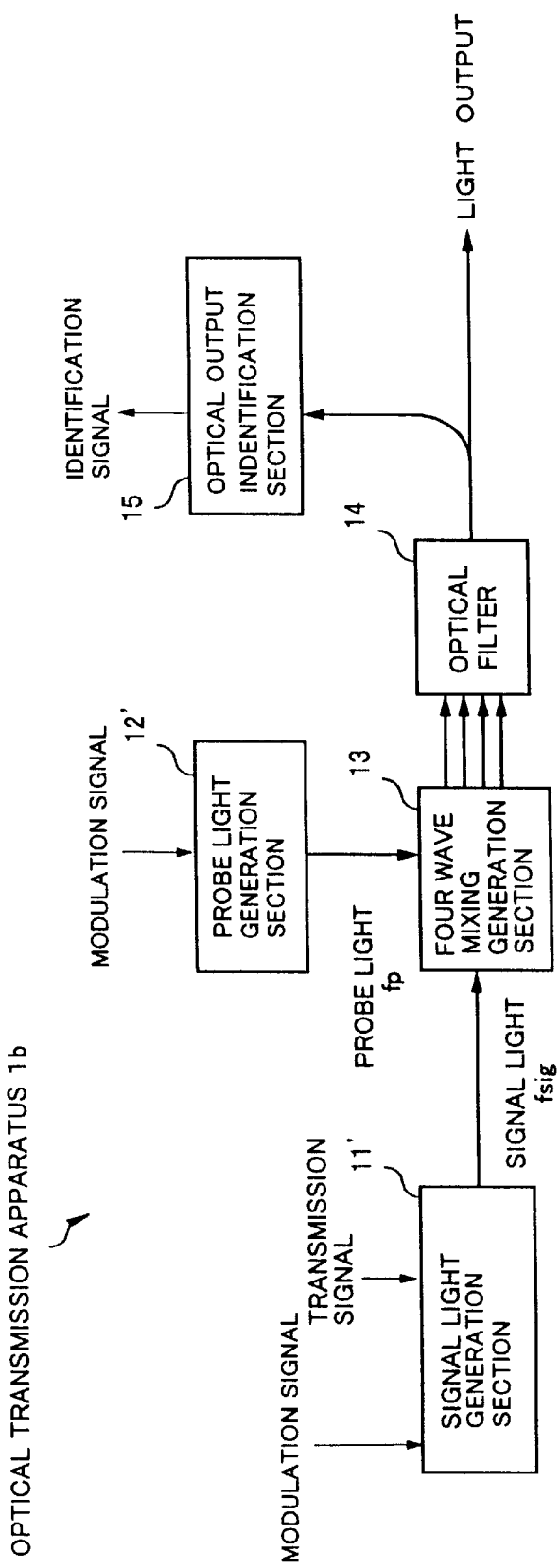
FIG. 2 is a diagram showing the construction of an optical transmission apparatus according to a second embodiment of the present invention.

FIG. 2 is a block diagram showing the construction of an optical transmission apparatus according to the second embodiment of the present invention. Construction the same as that of the first embodiment is denoted by the same symbols, and description thereof is omitted here and subsequently.

In FIG. 2, the differences between the construction of the optical transmission apparatus 1b of the second embodiment and that of the apparatus 1a of the first embodiment are that instead of the signal light generation section 11 and the probe light generation section 12 of the first embodiment, a signal light generation section 11' and a probe light generation section 12' are used which generate a signal light and a probe light respectively which are each superimposed with a different modulation signal, and that an optical output identification section 15 is provided which monitors a portion of the signal light output from the optical filter 14, which is branched by a device such as an optical coupler. The remaining sections of the apparatus are the same as those of the apparatus 1a.

The modulation signals superimposed on the signal light and the probe light differ, in frequency for example. Specifically for example, the first modulation signal superimposed on the signal light is set as a sine wave of frequency 1 kHz, and the second modulation signal superimposed on the probe light is set as a sine wave of frequency 5.5 kHz. The frequency of each modulation signal should be set so that a higher harmonic of one modulation signal does not coincide with the other modulation signal, and the depth of superimposition set at a value in the order of several %. Consequently, with the second embodiment the signal light generation section 11' and the probe light generation section 12' also function as a signal light modulation device and a probe light modulation device respectively.

With the signal light which has been output from the optical filter 14 and then branched by a device such as an optical coupler, the optical output identification section 15 detects the frequency of the modulation signal superimposed on the signal light, as well as detecting the optical power of the signal light in at least two wavelength regions. Then, based on the detection results, a decision is made as to which of the four signal lights being output from the four wave mixing generation section 13 the light passing through the optical filter 14 corresponds. Consequently, with this second embodiment, the optical output identification section 15 incorporates the functions of a modulation signal detection device, an optical power detection device, and an optical output identification device.

With the optical transmission apparatus 1b of this construction, a signal light of optical frequency fsig which has been high speed modulated in accordance with a transmission signal and on to which a modulation signal of frequency 1 kHz is superimposed, is sent from the signal light generation section 11' to the four wave mixing generation section 13, while at the same time a probe light of optical frequency fp on which a modulation signal of frequency 5.5 kHz is superimposed, is sent from the probe light generation section 12' to the four wave mixing generation section 13.

In the four wave mixing generation section 13, signal lights of optical frequency fsig, fp, 2×fsig−fp and 2×fp−fsig respectively are generated in the same manner as the first embodiment. Of the signal lights thus generated, the signal light of optical frequency fsig is superimposed with the modulation signal of frequency 1 kHz, the signal light of optical frequency fp is superimposed with the modulation signal of frequency 5.5 kHz, and the two signal lights of optical frequency 2×fsig−fp and 2×fp−fsig respectively are superimposed with both modulation signals. One of the four signal lights passes through the optical filter 14, and a portion thereof is sent to the optical output identification section 15.

By detecting the frequency of the modulation signal superimposed on the signal light being sent, the optical output identification section 15 is then able to identify the signal light passing through the optical filter 14 as being of either optical frequency fsig, fp, or of one of the two optical frequencies 2×fsig−fp and 2×fp−fsig.

Moreover, in those cases where the identification is made that the optical frequency of the signal light passing through the optical filter 14 is of either optical frequency 2×fsig−fp or 2×fp−fsig, final identification is achieved based on the optical power of the signal light detected in at least two wavelength regions. Specifically, if for example the operation of the probe light generation section 12 is controlled so that the optical frequency of the probe light fp increases, then the signal light of optical frequency 2×fsig−fp generated by the four wave mixing generation section 13 will decrease (and the wavelength thereof increase) while the signal light of optical frequency 2×fp−fsig will increase (and the wavelength thereof decrease). Consequently, in those cases where increasing the optical frequency fp of the probe light causes a shift in the optical power detected by the optical output identification section 15 from a short wavelength region to a long wavelength region, the signal light can be identified as being of optical frequency 2×fsig−fp. This identification can be made by monitoring the optical power in at least two wavelength regions. With this embodiment the optical frequency fp of the probe light was altered by controlling the probe light generation section 12. However the optical frequency fsig of the signal light could be altered in a similar manner by controlling the signal light generation section 11.

In this manner, by identifying by the optical output identification section 15, which of the signal lights generated by the four wave mixing generation section 13 has passed through the optical filter 14, and then outputting this result as an identification signal, a chirp signal light which is in accordance with the wavelength dispersion characteristics of the transmission path connected to the optical transmission apparatus 1b can be transmitted with reliability. In those cases where an identification is made that a chirp signal light which does not suit the wavelength dispersion characteristics of the transmission path is passing through the optical filter 14, then the setting of the transmission band of the optical filter 14 can be altered, or the optical frequency fsig of the signal light or the optical frequency fp of the probe light adjusted, until a desired signal light is obtained.

With the second embodiment described above, the explanation focused on the identification of the type of signal light passing through the optical filter 14 by superimposing modulation signals of different frequencies on the signal light and the probe light respectively. However the present invention is not limited to this situation alone.

For example, modulation signals of the same frequency but with offset phases could be superimposed on the signal light and the probe light. Specifically, in the case where modulation signals of the same frequency but differing in phase by ¼ of a cycle are superimposed on the signal light and the probe light respectively, output from the four wave mixing generation section 13 will consist of signal lights of optical frequencies fsig and fp which will have superimposed thereon modulation signals of the same frequency but which differ in phase by ¼ of a cycle, and signal lights of optical frequencies 2×fsig–fp and 2×fp–fsig which will have superimposed thereon modulation signals of approximately double the original frequency. Consequently, by using the optical output identification section 15 to detect the frequency and phase of the modulation signal superimposed on a signal light, classification into optical frequency fsig, fp, or (2×fsig–fp, 2×fp–fsig) is possible, and the identification of optical frequencies 2×fsig–fp and 2×fp–fsig can be carried out in the same manner as that described for the second embodiment.

In another example, in the case where modulation signals of the same frequency but differing in phase by ½ of a cycle are superimposed on the signal light and the probe light respectively, output from the four wave mixing generation section 13 will consist of signal lights of optical frequencies fsig and fp which will have superimposed thereon modulation signals of opposite phase, and signal lights of optical frequencies 2×fsig–fp and 2×fp–fsig in which the modulation signals will have cancelled one another out leaving no superimposed component. Consequently, by using the optical power identification section 15 to detect the presence of a superimposed modulation signal, and if present the phase thereof, classification of the signal light passing through the optical filter into optical frequency fsig, fp, or (2×fsig–fp, 2×fp–fsig) is possible, and the identification of optical frequencies 2×fsig–fp and 2×fp–fsig can be carried out in the same manner as that described for the second embodiment.

Next is a description of a third embodiment according to the present invention.

Figure 3:
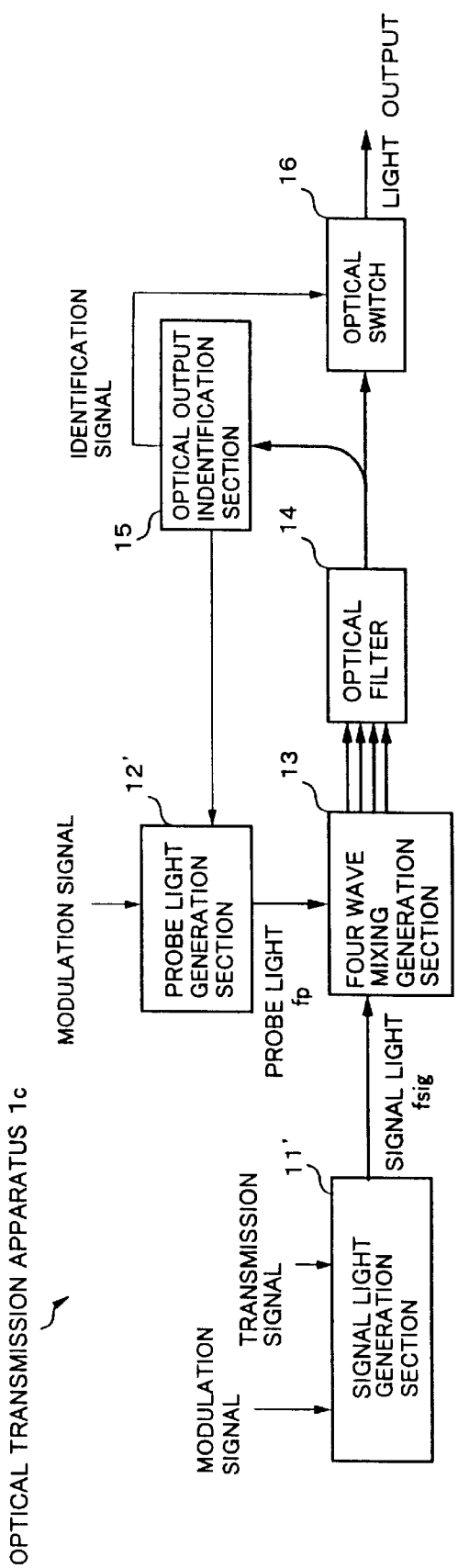
FIG. 3 is a diagram showing the construction of an optical transmission apparatus according to a third embodiment of the present invention.

FIG. 3 is a block diagram showing the construction of an optical transmission apparatus according to the third embodiment.

In FIG. 3, the part of the construction of the optical transmission apparatus 1c according to the third embodiment which differs from that of the optical transmission apparatus 1b according to the second embodiment is the part provided with an optical switch 16 serving as an optical output control device for blocking the signal light output from the optical filter 14 to the transmission path in accordance with the identification results from the optical output identification device 15. The remaining parts of the apparatus are the same as those described for the second embodiment.

In the case where the optical output identification device 15 detects that the signal light passing through the optical filter 14 is not of a desired type, the optical switch 16 blocks the transmission of the signal light from the optical filter 14 to the transmission path, in accordance with the identification signal output from the optical output identification section 15. Then, when suitable adjustments of the transmission band of the optical filter 14 and/or the optical frequency fsig of the signal light and/or the optical frequency fp of the probe light have resulted in a signal light of the desired type being output from the optical filter 14, the optical switch 16 is closed so that the signal light will be transmitted from the optical filter 14 to the transmission path.

Thus, by providing the third embodiment with an optical switch 16, because transmission of the signal light to the transmission path is blocked until a signal light output from the optical transmission apparatus 1c of a desired type can be selected, the occurrence of errors at the receiving end can be avoided, allowing more reliable optical transmissions.

Next is a description of a fourth embodiment according to the present invention.

Figure 4:
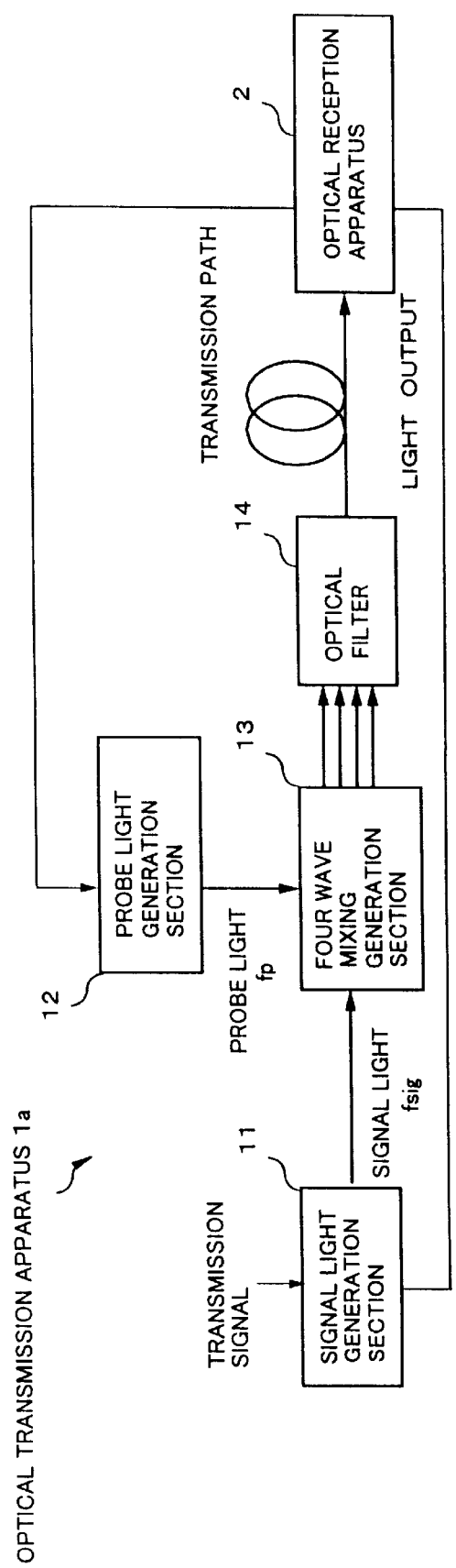
FIG. 4 is a diagram showing the construction of an optical transmission system according to a fourth embodiment of the present invention.

FIG. 4 is a block diagram showing the construction of an optical transmission system which utilizes an optical transmission apparatus according to the fourth embodiment.

In FIG. 4 the optical transmission system comprises an optical transmission apparatus 1a of the same construction as the first embodiment and an optical reception apparatus 2 which is connected to the optical transmission apparatus 1a via a transmission path. The optical reception apparatus 2 is a standard optical receiver which receives a signal light transmitted through the transmission path from the optical transmission apparatus 1a and then carries out processing such as identification processing. With this embodiment, information relating to the results of reception processing by the optical reception apparatus 2 is sent to the signal light generation section 11 and the probe light generation section 12 of the optical transmission apparatus 1a.

With an optical transmission system of this type of construction, when a chirp signal light which is unsuitable for compensating for the wavelength dispersion characteristics of the transmission path is sent through the transmission path from the optical transmission apparatus 1a, the waveform of the signal light becomes distorted before reaching the optical reception apparatus 2 due to the effect of wavelength dispersion, and the characteristics of the transmission deteriorate. Consequently, by monitoring at the optical reception apparatus 2 reception processing information such as the waveform of the received signal or error rate measurement results it is possible to judge whether a desired signal light is being transmitted from the optical transmission apparatus 1a. With this embodiment, reception processing information is conveyed from the optical reception apparatus 2 back to the optical transmission apparatus 1a, and by adjusting the optical frequency fsig of the signal light and the optical frequency fp of the probe light in accordance with the reception processing information, the chirp of the signal light being transmitted can be controlled to give optimum performance. In this way, it is possible to realize and maintain good transmission characteristics without having to equip the optical transmission apparatus with an optical output identification section or an optical switch.

Next is a description of a fifth embodiment according to the present invention.

Figure 5:
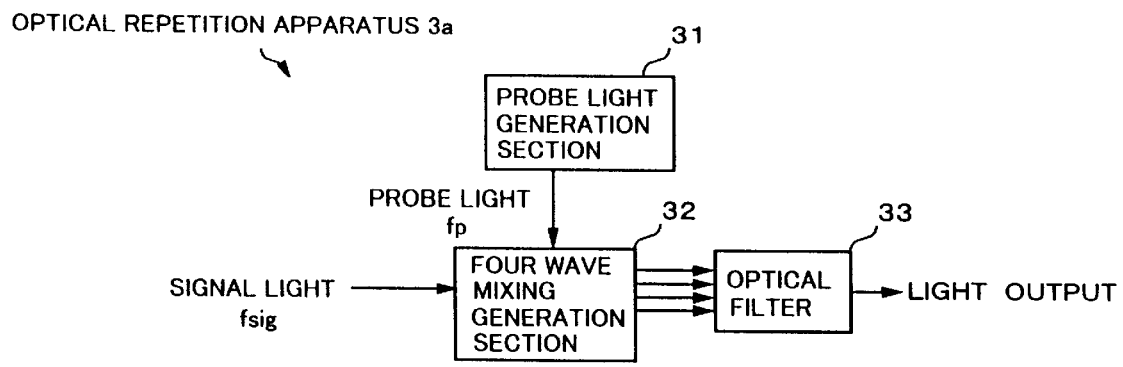
FIG. 5 is a diagram showing the construction of an optical repetition apparatus according to a fifth embodiment of the present invention.

FIG. 5 is a block diagram showing the construction of an optical repetition apparatus according to the fifth embodiment.

In FIG. 5, an optical repetition apparatus 3a according to the fifth embodiment comprises; a probe light generation section 31 for generating a probe light of optical frequency fp (wavelength λp), a four wave mixing generation section 32 into which is input a signal light of optical frequency fsig (wavelength λsig) which is received via a transmission path and the probe light, and which then generates four wave mixing, and an optical filter 33 for selecting and then outputting one of the signal lights output by the four wave mixing generation section 32.

The probe light generation section 31, the four wave mixing generation section 32, and the optical filter 33 are the same as the probe light generation section 12, the four wave mixing generation section 13, and the optical filter 14 of the first embodiment. This fifth embodiment differs from the first embodiment in that the signal light input to the four wave mixing generation section 32 is not generated by a signal light generation section 11, but is rather received via an input transmission path from a previous stage optical transmission apparatus or optical repetition apparatus not shown in FIG. 5.

With an optical repetition apparatus 3a of this type of construction, the signal light from the input transmission path and the probe light from the probe light generation section 31 are input into the four wave mixing generation section 32, resulting in the generation of four different signal lights of optical frequencies fsig, fp, 2×fsig−fp, and 2×fp−fsig respectively, as was the case with the first embodiment. Then, of the four signal lights, the one which corresponds with the wavelength dispersion characteristics of the output transmission path is selected by the optical filter 33 and output to the transmission path.

Thus with the optical repetition apparatus according to the fifth embodiment, as was the case for the optical transmission apparatus according to the first embodiment, the chirp characteristics, including the polarity, of the output signal light can be modified easily in accordance with the wavelength dispersion characteristics of the connected output transmission path. Consequently, it becomes possible to deal readily with any modifications to the optical communication system.

Next is a description of a sixth embodiment according to the present invention.

Figure 6:
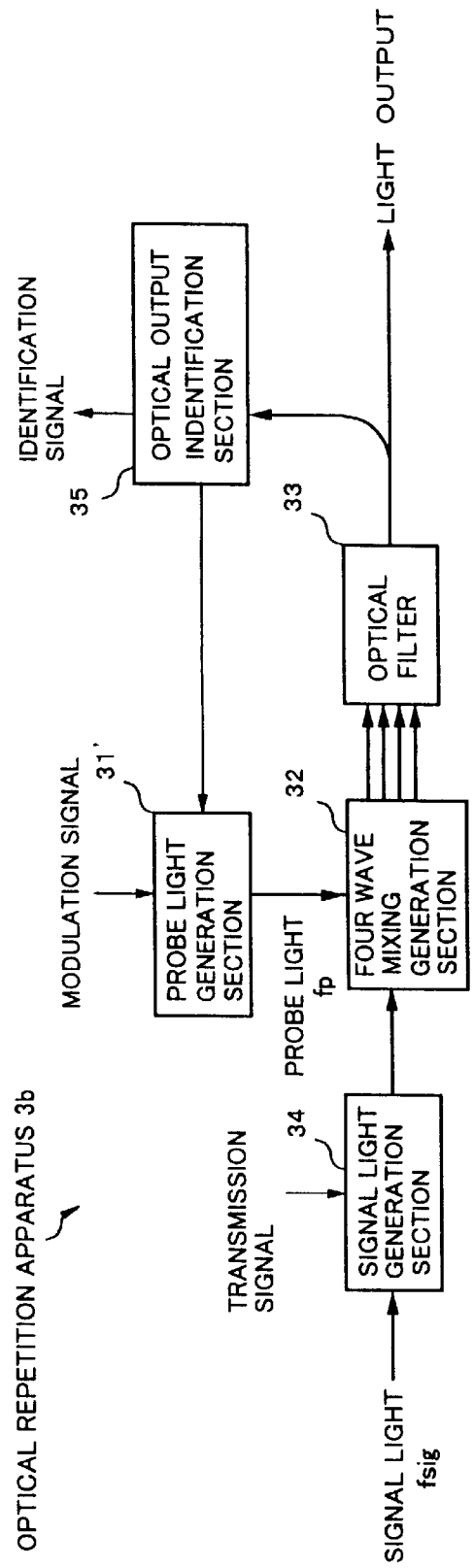
FIG. 6 is a diagram showing the construction of an optical repetition apparatus according to a sixth embodiment of the present invention.

FIG. 6 is a block diagram showing the construction of an optical repetition apparatus according to the sixth embodiment.

In FIG. 6, the differences between the construction of the optical repetition apparatus 3b of the sixth embodiment and that of the fifth embodiment 3a are that instead of the probe light generation section 31, a probe light generation section 31' is used which generates a probe light on which is superimposed a modulation signal, and that furthermore the apparatus 3b is provided with a signal light modulation section 34 which superimposes on the signal light received via the transmission path a modulation signal of a frequency different from that of the aforementioned modulation signal, and an optical output identification section 35 which monitors a portion of the signal light output from the optical filter 33 which is branched by a device such as an optical coupler. The remaining sections of the apparatus 3b are the same as those described for the optical repetition apparatus 3a.

The probe light generation section 31' and the optical output identification section 35 are the same as the probe light generation section 12' and the optical output identification section 15 of the second embodiment. The signal light modulation section 34 superimposes a modulation signal at a depth of several % on the high speed modulated signal light of optical frequency fsig received via the transmission path. The modulation signal superimposed by the signal light modulation section 34 and the modulation signal superimposed on the probe light by the probe light generation section 12' are set at different frequencies, and moreover the frequencies are set so that a higher harmonic of one modulation signal does not coincide with the other modulation signal.

With an optical repetition apparatus 3b of this type of construction, a signal light of optical frequency fsig on which a modulation signal has been superimposed by the signal light modulation section 34 is sent to the four wave mixing generation section 32, and a probe light of optical frequency fp on which is superimposed a modulation signal of a frequency different from the aforementioned modulation signal is sent from the probe light generation section 31' to the four wave mixing generation section 32. Then, in the same manner as was described for the second embodiment, the four wave mixing generation section 32 generates signal lights of optical frequencies fsig, fp, 2×fsig−fp, and 2×fp−fsig, on each of which is superimposed a modulation signal, and then one of the four signal lights passes through the optical filter 33, and a portion of the signal light is sent to the optical output identification section 35. In the optical output identification section 35, the frequency of the modulation signal superimposed on the received signal light is detected, and the optical power of the signal light is also detected in at least two wavelength regions. Based on the detection results, an identification is then made as to which of the four signal lights output from the four wave mixing generation section 32 is the signal light passing through the optical filter 33, and an identification signal is then output.

By using the sixth embodiment in this manner to monitor the signal light passing through the optical filter 33 using the optical output identification section 35, a chirp signal light which corresponds with the wavelength dispersion characteristics of the transmission path of the following stage can be reliably output. In the case where an identification is made that a chirp signal light which is unsuitable for the wavelength dispersion characteristics of the transmission path is passing through the optical filter 33, the setting of the transmission band of the optical filter 33 can be altered, and/or the optical frequency fp of the probe light adjusted, until a desired signal light is obtained.

With the sixth embodiment described above, the explanation focused on the superimposition of modulation signals of different frequencies on the signal light and the probe light respectively. However as was discussed in the description of the second embodiment, modulation signals of the same frequency but which differ in phase by either ¼ of a cycle or ½ of a cycle can also be superimposed on the signal light and the probe light. Furthermore, in the same manner as that described in the third embodiment, an optical switch can be provided which blocks the signal light passing through the optical filter 33 and out to the transmission path in accordance with the identification results from the optical output identification section 35.

Next is a description of a seventh embodiment according to the present invention.

Figure 7:
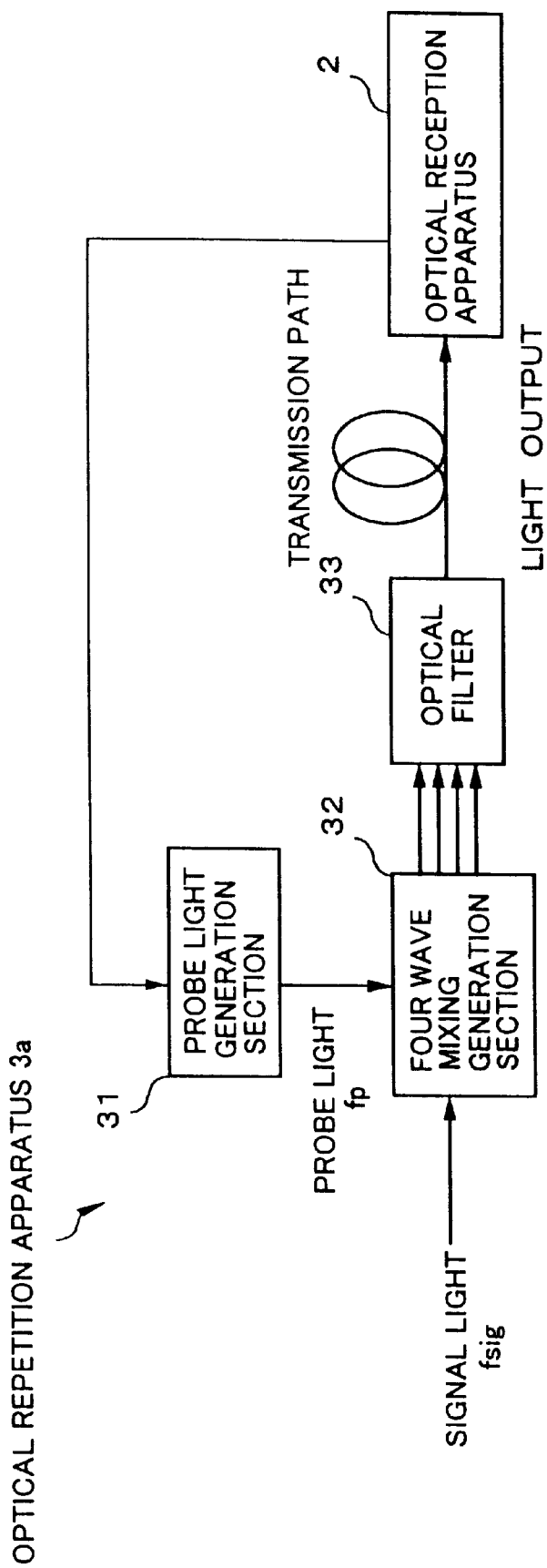
FIG. 7 is a diagram showing the construction of an optical transmission system according to a seventh embodiment of the present invention.

FIG. 7 is a block diagram showing the construction of an optical transmission system which utilizes an optical repetition apparatus according to the seventh embodiment.

In FIG. 7 the optical transmission system comprises an optical repetition apparatus 3a of the same construction as the fifth embodiment and an optical reception apparatus 2 which is connected to the optical repetition apparatus 3a via a transmission path. The optical reception apparatus 2 is a standard optical receiver which receives a signal light transmitted through the transmission path and then carries out processing such as identification processing, and then sends reception processing information to the probe light generation section 31 of the optical repetition apparatus 3a.

With an optical transmission system of this type of construction, as was the case for the fourth embodiment, it is possible to ascertain, based on the measurement results from the optical reception apparatus 2, whether a desired signal light is being output from the optical repetition apparatus 3a. With this embodiment, reception processing information is conveyed from the optical reception apparatus 2 back to the probe light generation section 31 of the optical repetition apparatus 3a, and by adjusting the optical frequency fp of the probe light in accordance with the reception processing information, the chirp of the signal light being output can be controlled to give optimum performance. In this way, it is possible to realize and maintain good transmission characteristics.

With the embodiments 1 through 7 described above, the probe light generation sections and the four wave mixing generation sections are provided as separate sections. However the present invention is not limited to these cases, and the use of devices such as the recently developed long resonator 4/λ shift DFB-LD, which comprises a section which combines a probe light generation laser and an element which generates four wave mixing, is also possible. Furthermore, in those cases where the optical power of the signal light or the probe light, or the optical power of the respective signal lights output from the four wave mixing generation section is low, an optical amplifier can be used to amplify the signal lights.

What is claimed is:

1. An optical transmission apparatus comprising:

a signal light generator to generate a signal light which has been modulated in accordance with a transmission signal, a probe light generator to generate a probe light of an optical frequency different from the optical frequency of the signal light generated by said signal light generator, a four wave mixing generator in which the signal light output from said signal light generator and the probe light output from said probe light generator are injected into a medium having a nonlinear optical effect to generate and output a plurality of signal lights by four wave mixing, a signal light selector to select any one of the plurality of signal lights output from said four wave mixing generator in accordance with the wavelength dispersion characteristics of the transmission path and then output the selected signal light to said transmission path, the output signal light having a wavelength corresponding to that of the selected signal light, and an optical frequency controller to control at least one of the optical frequency of the signal light generated by said signal light generator and the optical frequency of the probe light generated by said probe light generator.

2. An optical transmission apparatus according to claim 1, wherein said optical frequency controller controls the optical frequency to optimize reception characteristics, based on information relating to the results of reception processing by an optical reception apparatus connected to a terminal of said transmission path.

3. An optical transmission apparatus according to claim 1, further comprising:

a signal light modulator to superimpose a first modulation signal on the signal light generated by said signal light generator, a probe light modulator to superimpose a second modulation signal different from said first modulation signal on the probe light generated by said probe light generator, a modulation signal detector to detect the superimposed modulation signal in the signal light output from said signal light selector, an optical power detector to alter the optical frequency by means of said optical frequency controller in accordance with the detection results from said modulation signal detector and detecting the optical power in at least two wavelength regions of the signal light output from said signal light selector, and an optical output identification section to identify, based on the detection results from said modulation signal detector and said optical power detector, whether or not a signal light in accordance with the wavelength dispersion characteristics of said transmission path is being output from said signal light selector.

4. An optical transmission apparatus according to claim 3, wherein an optical output controller is provided to control the output conditions of the signal light output from said signal light selector to the transmission path, in accordance with the identification results from said optical output identification section.

5. An optical transmission apparatus according to claim 3, wherein said first modulation signal and said second modulation signal are signals with different frequencies, and said modulation signal detector detects the frequency of said superimposed modulation signal.

6. An optical transmission apparatus according to claim 3, wherein said first modulation signal and said second modulation signal are signals with the same frequency but for which the phases differ by ¼ of a cycle, and said modulation signal detector detects the frequency and phase of said superimposed modulation signal.

7. An optical transmission apparatus according to claim 3, wherein said first modulation signal and said second modulation signal are signals with the same frequency but for which the phases differ by ½ of a cycle, and said modulation signal detector detects the presence and phase of said superimposed modulation signal.

8. An optical transmission apparatus comprising:

signal light generation means for generating a signal light which has been modulated in accordance with a transmission signal, probe light generation means for generating a probe light of an optical frequency different from the optical frequency of the signal light generated by said signal light generation means, four wave mixing generation means in which the signal light output from said signal light generation means and the probe light output from said probe light generation means are injected into a medium having a nonlinear optical effect to generate and output a plurality of signal lights by four wave mixing, and signal light selection means for selecting any one of the plurality of signal lights output from said four wave mixing generation means in accordance with the wavelength dispersion characteristics of the transmission path and then outputting the selected signal light to said transmission path, the output signal light having a wavelength corresponding to that of the selected signal light, and optical frequency control means for controlling at least one of the optical frequency of the signal light generated by said signal light generation means and the optical frequency of the probe light generated by said probe light generation means.

9. An optical transmission apparatus comprising:

a signal light generator to generate a signal light which has been modulated in accordance with a transmission signal, a probe light generator to generate a probe light having an optical frequency different from the optical frequency of the signal light generated by said signal light generator, a four wave mixing generator in which the signal light output from said signal light generator and the probe light output from said probe light generator are injected into a medium having a non linear optical effect to generate a mixed light by four wave mixing and output the signal light and the mixed light, and a signal light selector to receive the signal light and the mixed light from the four wave mixing generator, to select the mixed light, and to output the mixed light to a transmission path, the output signal light having a wavelength corresponding to that of the mixed light.

10. An optical repetition apparatus according comprising:

a probe light generator to generate a probe light of a different optical frequency from that of a signal light received from an input transmission path, a four wave generator in which the signal light received from said input transmission path and the probe light output from said probe light generator are injected into a medium having a nonlinear optical effect to generate and output a plurality of signal lights by four wave mixing, a signal light selector to select any one of the plurality of signal lights output from said four wave mixing generator, in accordance with the wavelength dispersion characteristics of an output transmission path and then output the selected sig light to said output transmission path, the output signal light having a wavelength corresponding to that of the selected sign light, and an optical frequency controller to control the optical frequency of the probe light generated by said probe light generator.

11. An optical repetition apparatus according to claim 10, further comprising:

a signal light modulator to superimpose a first modulation signal on the signal light received from said input transmission path, a probe light modulator to superimpose a second modulation signal different from said first modulation signal on the probe light generated by said probe light generator, a modulation signal detector to detect the superimposed modulation signal in the signal light output from said signal light selector, an optical power detector to alter the optical frequency by means of said optical frequency controller in accordance with the detection results from said modulation signal detector and detecting the optical power in at least two wavelength regions of the signal light output from said signal light selector, and an optical output identification section to identify, based on the detection results from said modulation signal detector and said optical power detector, whether or not a signal light in accordance with the wavelength dispersion characteristics of said output transmission path is being output from said signal light selector.

12. An optical repetition apparatus according to claim 11, wherein an optical output controller is provided to control the output conditions of the signal light output from said signal light selector to the output transmission path in accordance with the identification results from said optical output identification section.

13. An optical repetition apparatus according to claim 11, wherein said first modulation signal and said second modulation signal are signals with different frequencies, and said modulation signal detector detects the frequency of said superimposed modulation signal.

14. An optical repetition apparatus according to claim 11, wherein said first modulation signal and said second modulation signal are signals with the same frequency but for which the phases differ by ¼ of a cycle, and said modulation signal detector detects the frequency and phase of said superimposed modulation signal.

15. An optical repetition apparatus according to claim 11, wherein said first modulation signal and said second modulation signal are signals with the same frequency but for which the phases differ by ½ of a cycle, and said modulation signal detector detects the presence and phase of said superimposed modulation signal.

16. An optical repetition apparatus according to claim 10, wherein said optical frequency controller controls the optical frequency to optimize reception characteristics, based on information relating to the results of reception processing by an optical reception apparatus connected to a terminal of said output transmission path.

17. A transmission method comprising:

generating a probe light of an optical frequency different from the optical frequency of a signal light modulated in accordance with a transmitted signal, controlling the optical frequency of the probe light, generating a plurality of signal lights by four wave mixing in which said signal light and said probe light are injected into a medium having a nonlinear optical effect, and selecting any one of the plurality of signal lights generated by said four wave mixing in accordance with the wavelength dispersion characteristics of a transmission path and then outputting the selected signal light to said transmission path, the output signal light having a wavelength corresponding to that of the selected signal light.

* * * * *